(12) United States Patent
Bezos

(10) Patent No.: US 6,525,747 B1
(45) Date of Patent: Feb. 25, 2003

(54) METHOD AND SYSTEM FOR CONDUCTING A DISCUSSION RELATING TO AN ITEM

(75) Inventor: Jeffrey P. Bezos, Seattle, WA (US)

(73) Assignee: Amazon.com, Inc., Seattle, WA (US)

(*) Notice: Subject to any disclaimer, the term of this patent is extended or adjusted under 35 U.S.C. 154(b) by 0 days.

(21) Appl. No.: 09/365,513

(22) Filed: Aug. 2, 1999

(51) Int. Cl.$^7$ .................................................. G06F 3/14
(52) U.S. Cl. ........................ 345/751; 345/753; 345/758; 345/752; 345/760
(58) Field of Search ................................ 345/753, 758, 345/759, 733, 752, 760, 962, 751; 709/200, 201; 707/501.1; 705/26, 27, 37

(56) References Cited

U.S. PATENT DOCUMENTS

| | | | | |
|---|---|---|---|---|
| 4,578,766 A | * | 3/1986 | Caddy | 364/521 |
| 4,808,979 A | * | 2/1989 | DeHoff et al. | 340/705 |
| 5,162,779 A | * | 11/1992 | Lumelsky et al. | 340/709 |
| 5,264,836 A | * | 11/1993 | Rubin | 345/157 |
| 5,268,677 A | * | 12/1993 | Frasier et al. | 345/118 |
| 5,293,529 A | * | 3/1994 | Yoshimura et al. | 345/158 |
| 5,715,402 A | * | 2/1998 | Popolo | 705/37 |
| 5,808,613 A | * | 9/1998 | Marrin et al. | 345/357 |
| 5,874,953 A | * | 2/1999 | Webster et al. | 345/329 |
| 5,886,700 A | * | 3/1999 | Di Pippo et al. | 345/348 |
| 5,890,138 A | * | 3/1999 | Godin et al. | 705/1 |
| 5,960,411 A | * | 9/1999 | Hartman et al. | 705/26 |
| 5,991,740 A | * | 11/1999 | Messer | 705/27 |
| 6,012,925 A | * | 1/2000 | Kelly et al. | 434/107 |
| 6,014,135 A | * | 1/2000 | Fernandes | 345/331 |
| 6,014,142 A | * | 1/2000 | LaHood | 345/355 |
| 6,026,383 A | * | 2/2000 | Ausubel | 705/37 |
| 6,044,363 A | * | 3/2000 | Mori et al. | 705/26 |
| 6,052,121 A | * | 4/2000 | Webster et al. | 345/329 |
| 6,108,493 A | * | 8/2000 | Miller et al. | 395/200.49 |
| 6,138,139 A | * | 10/2000 | Beck et al. | 705/1 |
| 6,151,589 A | * | 11/2000 | Aggarwal et al. | 705/1 |
| 6,166,718 A | * | 12/2000 | Takeda | 345/145 |
| 6,167,395 A | * | 12/2000 | Beck et al. | 707/3 |
| 6,199,050 B1 | * | 3/2001 | Alaia et al. | 705/1 |
| 6,222,535 B1 | * | 4/2001 | Hurd, II | 345/331 |
| 6,249,773 B1 | * | 6/2001 | Allard et al. | 705/26 |
| 6,266,649 B1 | * | 7/2001 | Linden et al. | 705/26 |
| 6,271,854 B1 | * | 8/2001 | Light | 345/427 |
| 6,317,722 B1 | * | 11/2001 | Jacobi et al. | 705/14 |
| 6,339,434 B1 | * | 1/2002 | West et al. | 345/667 |
| 6,408,283 B1 | * | 6/2002 | Alaia et al. | 705/26 |

* cited by examiner

*Primary Examiner*—Kristine Kincaid
*Assistant Examiner*—Thomas T. Nguyen
(74) *Attorney, Agent, or Firm*—Perkins Coie LLP

(57) ABSTRACT

A method and system for conducting an electronic discussion relating to a topic. The discussion system of the present invention receives a selection of an item that is to be the topic of the discussion. The discussion system then receives comments relating to the selected item and generates a message that includes a description of the selected item and the received comments. The discussion system then sends the generated message to participants of the discussion. The discussion system receives from a participant who received the generated message additional comments that are to be added to the generated message. The discussion system sends the generated message along with received additional comments to the participants of the discussion.

71 Claims, 13 Drawing Sheets

Browser

You are a participant in the following discussions:

Private:

| Item | Date of Last Comment | Originator | Withdraw |
|---|---|---|---|
| ☐ | | | |
| ☐ | | | |
| ☐ | | | |
| ☐ | | | |
| ☐ | | | |

⎫ 801

Public:

| Item | Date of Last Comment | | |
|---|---|---|---|
| ☐ | | | |
| ☐ | | | |
| ☐ | | | |

METHOD AND SYSTEM FOR CONDUCTING A DISCUSSION RELATING TO AN ITEM

TECHNICAL FIELD

The present invention relates to a computer method and system of obtaining information relating to an item and, more particularly, to a method and system for conducting an electronic discussion relating to the item.

BACKGROUND OF THE INVENTION

The Internet is increasingly being used to conduct "electronic commerce," because it comprises a vast number of computers and computer networks that are interconnected through communication links which facilitates electronic communications between vendors and purchasers. Electronic commerce refers generally to commercial transactions that are at least partially conducted using the computer systems of the parties to the transactions. For example, a purchaser can use a personal computer to connect via the Internet to a vendor's computer. The purchaser can then interact with the vendor's computer to conduct the transaction. Although many of the commercial transactions that are performed today could be performed via electronic commerce, the acceptance and wide-spread use of electronic commerce depends, in large part, upon the ease-of-use of conducting such electronic commerce. If electronic commerce can be easily conducted, then even the novice computer user will choose to use electronic commerce. Therefore, it is important that techniques be developed to facilitate conducting electronic commerce.

The Internet provides a network that facilitates conducting electronic commerce because it uses standardized techniques for exchanging information. Many standards have been established for exchanging information over the Internet, such as electronic mail, Gopher, and the World Wide Web ("WWW"). The WWW service allows a server computer system (i.e., Web server or Web site) to send graphical Web pages of information to a remote client computer system. The remote client computer system can then display the Web pages. Each resource (e.g., computer or Web page) of the WWW is uniquely identifiable by a Uniform Resource Locator ("URL"). To view a specific Web page, a client computer system specifies the URL for that Web page in a request (e.g., a HyperText Transfer Protocol ("HTTP") request). The request is forwarded to the Web server that supports that Web page. When that Web server receives the request, it sends that Web page to the client computer system. When the client computer system receives that Web page, it typically displays the Web page using a browser. A browser is typically a special-purpose application program that effects the requesting of Web pages and the displaying of Web pages.

Currently, Web pages are generally defined using HyperText Markup Language ("HTML"). HTML provides a standard set of tags that define how a Web page is to be displayed. When a user indicates to the browser to display a Web page, the browser sends a request to the server computer system to transfer to the client computer system an HTML document that defines the Web page. When the requested HTML document is received by the client computer system, the browser displays the Web page as defined by the HTML document. The HTML document contains various tags that control the displaying of text, graphics, controls, and other features. The HTML document may contain URLs of other Web pages available on that server computer system or other server computer systems.

The World Wide Web portion of the Internet is especially conducive to conducting electronic commerce. Many Web servers have been developed through which vendors can advertise and sell product. The products can include items (e.g., music) that are delivered electronically to the purchaser over the Internet and items (e.g., books) that are delivered through conventional distribution channels (e.g., a common carrier). A server computer system may provide an electronic version of a catalog that lists the items that are available. A user, who is a potential purchaser, may browse through the catalog using a browser and select various items that are to be purchased. When the user has completed selecting the items to be purchased, the server computer system then prompts the user for information to complete the ordering of the items. This purchaser-specific order information may include the purchaser's name, the purchaser's credit card number, and a shipping address for the order. The server computer system then typically confirms the order by sending a confirming Web page to the client computer system and schedules shipment of the items.

Although the use of the WWW is expanding rapidly because it facilitates the buying and selling of goods through electronic commerce, the WWW also makes vast amounts of information that is not directly related to electronic commerce easily accessible. For example, a public library may make its catalog of books available through the WWW. A person can browse through the catalog to identify available books on a certain topic. As another example, various news reporting organizations are publishing stories on the WWW. The news reporting organizations may or may not charge a fee for accessing their stories. Whether or not a fee is charged, the news reporting organizations may derive revenue from advertisements provided when a story is accessed.

In general, the providers of Web sites want to encourage access to their Web sites because, for example, they may derive revenue from such access (e.g., advertising revenues) or the access advances their goal of disseminating information (e.g., a library catalog).

When a user locates information on the WWW, the user may want to share the information with other users. For example, users who access Web sites may be affiliated with an organization or a group, such as a local investment club. When a member of that club finds information on the WWW, the member may want to notify the other members. The member may also want to elicit feedback from the other members of the club. The member can notify the other members in several different ways. For example, the member can place a telephone call or send email to each of the other members. To notify the other members via email, the member would need to start the email system, generate an email describing the information to be shared, and send the email to the other members. When the other members receive the email, they can view the information on the WWW, and reply to the email. This sharing of information can be quite cumbersome because, for example, the user may need to cut and paste the information from the Web page into the email. If a Web site provided a mechanism that allowed its information to be more easily shared, then users would be more likely to access such a web site.

SUMMARY OF THE INVENTION

Embodiments of the present invention provide a method and system for conducting an electronic discussion relating to a topic. The discussion system of the present invention receives a selection of an item that is to be the topic of the discussion. The discussion system then receives comments relating to the selected item and generates a message that includes a description of the selected item and the received comments. The discussion system then sends the generated message to participants of the discussion. The discussion system receives from a participant who received the generated message additional comments that are to be added to the generated message. The discussion system then sends the generated message along with received additional comments to the participants of the discussion.

In one aspect of the present invention, the discussion system starts a discussion relating to an item. The discussion system provides to a browser information describing the item and an indicator for starting a discussion relating to the item so that the information and the indicator can be displayed by the browser to an originating participant. In response to selection of the displayed indicator by the originating participant of the discussion, the discussion system provides to the originating participant an initial discussion thread that includes a description of the item. The discussion system then receives from the originating participant comments to be added to the discussion thread and an indication of one or more other participants of the discussion. The discussion system then sends the discussion thread, with the description of the item and the received comments added, to the other participants.

In another aspect of the present invention, the discussion system allows a user to join a discussion relating to an item. The discussion system provides to a browser information describing the item and an indicator for joining a discussion relating to the item so that the information and the indicator can be displayed by the browser to a requesting user. In response to selection of the displayed indicator by the requesting user, the discussion system notifies a designated user for the discussion that the requesting user has requested to join the discussion. The discussion system then receives from the designated user a join indication as to whether the requesting user may join the discussion. When the join indication indicates that the requesting user may join the discussion, the discussion system adds the requesting user as a participant of the discussion and notifies the requesting user in accordance with the join indication.

In yet another aspect of the present invention, the discussion system provides a method and system for adding an item to a discussion relating to another item. The discussion has a discussion thread that is the content of the discussion. The discussion system provides to a browser information describing the item and an indicator for adding the item to an ongoing discussion relating to the other item so that the information and the indicator can be displayed by the browser to a participant of the discussion. In response to selection of displayed indicator by the participant, the discussion system adds a description of the item to the discussion for the other item and sends the discussion thread for the discussion, with the added description of the item, to participants of the discussion.

BRIEF DESCRIPTION OF THE DRAWINGS

FIG. 8 is a diagram illustrating a sample Web page that describes the discussions in which the user is a participant.

DETAILED DESCRIPTION OF THE INVENTION

Figure 1:
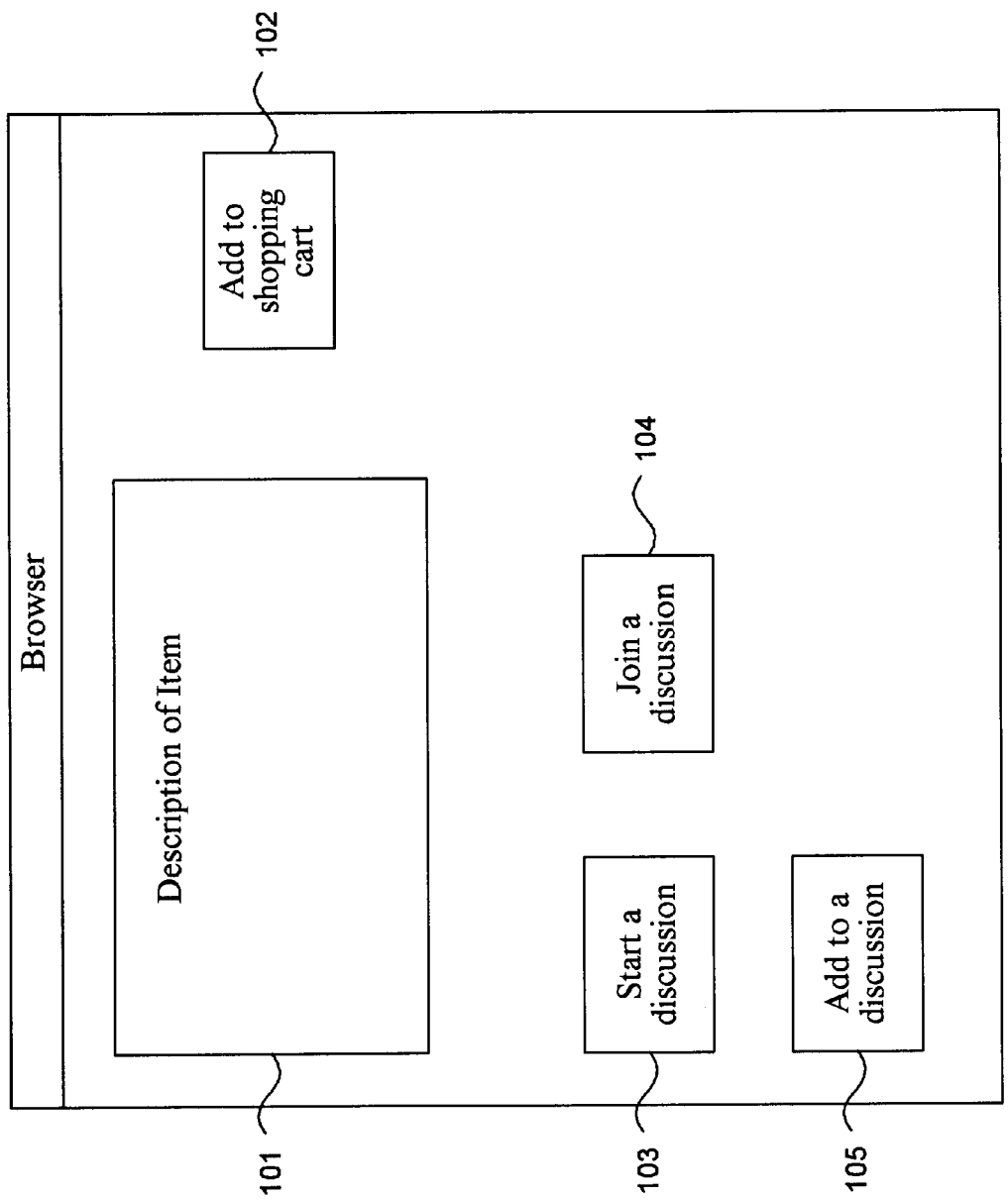
FIG. 1 is a diagram illustrating a sample Web page of the discussion system that is displayed by a browser.

Embodiments of the present invention provide a method and system for facilitating the sharing of information electronically. The system of the present invention not only facilitates sharing of information, but also coordinates the dissemination of comments from those who receive the information. The process of sharing the information and disseminating the information is referred to as a "discussion." The shared information and the disseminated comments compose a "discussion thread." The discussion system allows a user ("the originating participant" of the discussion) to select an item to be the topic of a discussion, automatically generates a message describing the topic, allows the originating participant to add comments to the message, and then sends the message to other participants designated by the originating participant. The discussion system may also track comments added by the other participants in reply to the message. In the following, an implementation of the discussion system is described with reference to electronic commerce conducted via the WWW. One skilled in the art would appreciate that the discussion system may be used in conjunction with a non-commercial environment and with a network other than the WWW or even with a system that is not based on a network. Also, one skilled in the art would appreciate that the term "item" refers to anything (e.g., book, news story, musical score, electronic product, scientific theory) for which a user wants to share information about with other users or to elicit comments from other users.

In one embodiment, the discussion system is provided as part of a Web site. When a user displays a Web page using a browser, the user ("originating participant") may select to start a discussion relating to an item displayed as part of the Web page. The discussion system may generate a message (e.g., email message) that includes a description of the item and may send the message to the other participants designated by the originating participant. The originating participant may optionally add comments to the message before it is sent. When a participant receives the message, the participant may choose to reply to the message by adding comments and sending the message to the other participants. The discussion system may use an internal message management facility or may use an external message management facility, such as an electronic mail system. When using an internal message management facility, the discussion system directly receives, stores, and distributes the comments. When using an external message management facility, the discussion system sends the initial message to each participant as an email. Each participant may then add comments to the email and send the email back to the discussion system for distribution to the other participants. Because the discussion system acts as a hub for receiving and distributing emails, it can track and store all the comments added to the discussion. Alternatively, the participants may directly send an email with their added comments to the other participants and send a copy to the discussion system so that it can track the discussion. In this alternative embodiment, the discussion system may rely on each participant to ensure that the copy is sent to the discussion system. The discussion system also allows users to join a discussion that is ongoing. When a user joins a discussion, the discussion system may provide the user with access to all the comments of the discussion.

Discussions may be classified as private or public. If a discussion is public, then any user can join the discussion without receiving permission (e.g., from the originating participant). If a discussion is private, however, then permission is needed before a requesting user can join the discussion. Permission to join a discussion may be granted or denied by the originating participant or other user who has the authority to grant such permission. If a requesting user is granted permission, then the discussion system sends the discussion thread to the requesting user and designates that the requesting user is a participant. A private discussion for which a user may request to join is referred to as an "open" discussion. The originating participant of an open discussion can provide an appropriate description of the discussion so that potential requesting users can decide whether they want to join the discussion. In contrast, a "closed" discussion is one for which no user can be added as a participant in the discussion and the discussion may not even be advertised so that non-participants may not even be aware that the discussion is in progress.

FIG. 1 is a diagram illustrating a sample Web page of the discussion system that is displayed by a browser. The Web page contains a description of the item 101, an add to shopping cart button 102, a start a discussion button 103, a join a discussion button 104, and an add to a discussion button 105. The description of the item section contains a description of an item that may be purchased by the user. For example, if the item is a book, the description may include the title, author, publisher, and date of publication of the book. The add to shopping cart button is used in conjunction with a conventional shopping cart metaphor for electronic purchase of items. The start a discussion button is used to start a discussion relating to the described item. The join a discussion button is used to join an ongoing discussion relating to the describe item. The add to a discussion button is used to add the description of the item to an ongoing discussion relating to another item. The starting, joining, and adding to a discussion are described in detail below.

Figure 2:
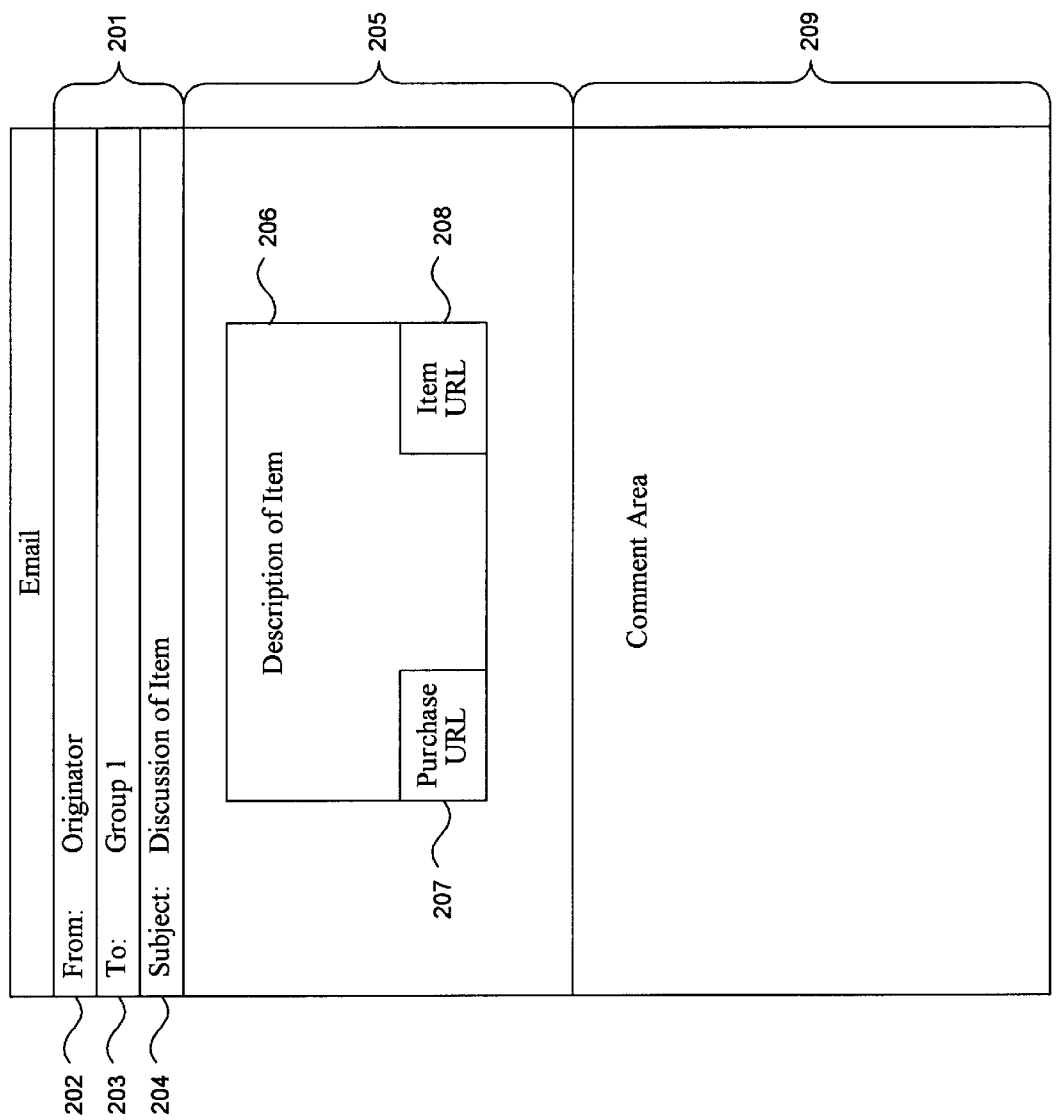
FIG. 2 is a diagram illustrating a sample originating email of a discussion.

FIG. 2 is a diagram illustrating a sample originating email of a discussion. In the following, the term "email" refers to the mechanism by which a message (or discussion thread) is disseminated to the participants whether the discussion system uses internal or external message management facility. The email component of the discussion system displays this email in response to selection of the start a discussion button. The email contains an email header 201 that includes a from field 202, to field 203, and subject field 204. The email component may pre-fill the from field with the name of the user who selected the start a discussion button ("the originating participant"). Some message management facilities may not even display the from field because it is always assumed to be the user. The email component may also pre-fill the subject field with a description of the discussion. The email contains a body that includes a discussion description section 205. The discussion description section may contain a description of item section 206, a purchase URL 207 and an item URL 208. The purchase URL can be selected at any time to affect the purchasing of the item, and the item URL can be used to obtain more information about the item. The purchase URL may be implemented using single-action ordering, which is described in U.S. patent application Ser. No. 08/928,951, entitled "Method and System for Placing a Purchase Order Via a Communications Network," filed Sep. 12, 1997, which is hereby incorporated by reference. The email component pre-fills the discussion description section. The originating participant of the discussion can enter comments into the comment area 209 and indicate the participants of the discussion in the to field. The participants can either be identified by their names, by their email names or by a name of group of names. The email component may also display a field so that the originating participant can indicate if the discussion is to be public or private (and open or closed) and another field so that the originating participant can provide a description of the discussion. Alternatively, the discussion system can use the subject field as the description of the discussion or automatically generate a description.

Figure 3:
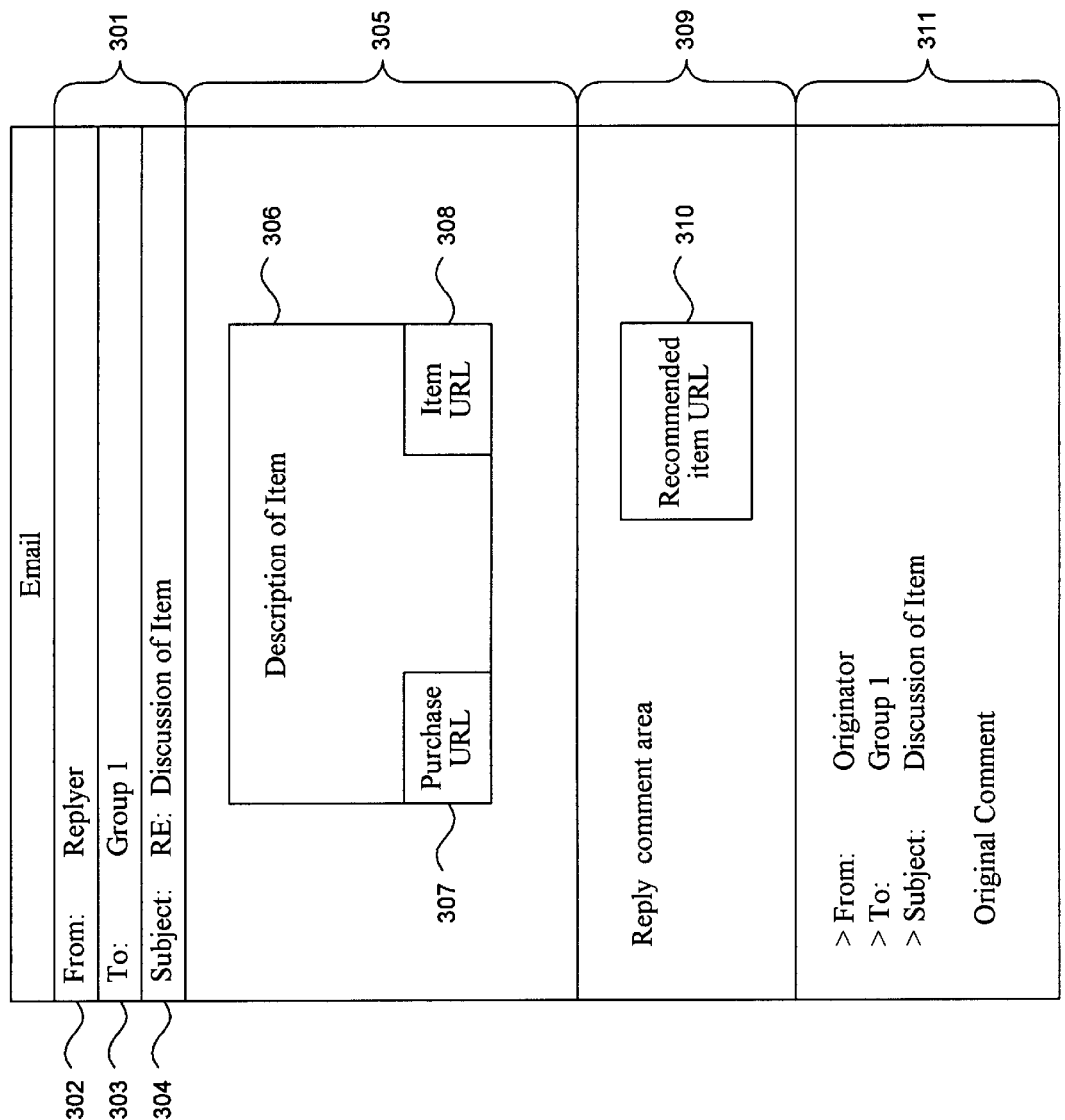
FIG. 3 is a diagram illustrating a sample reply email of a discussion.

FIG. 3 is a diagram illustrating a sample reply email of a discussion. After an email for a discussion is received by a participant, the participant may add comments to the discussion via reply email. The reply email contains a header section 301, a discussion description section 305, a reply comment area 309, and a previous comment area of 311. The discussion system displays this reply email in response to a participant's request to add comments to the discussion. The header section contains a from field 302, a to field 303, and a subject field 304. The discussion system may pre-fill each of these header fields. The discussion description section contains a description of the item 306, a purchase URL 307, and an item URL 308. The replying participant adds additional comments into the reply comment area. The replying participant may also add a URL to the reply comment area such as the recommended item URL 310. The recommended item URL may be used, for example, to recommend that the participants purchase the recommended item, rather than the item that is the topic of the discussion. The previous comment area contains a listing of the comments previously in this discussion.

Figure 4:
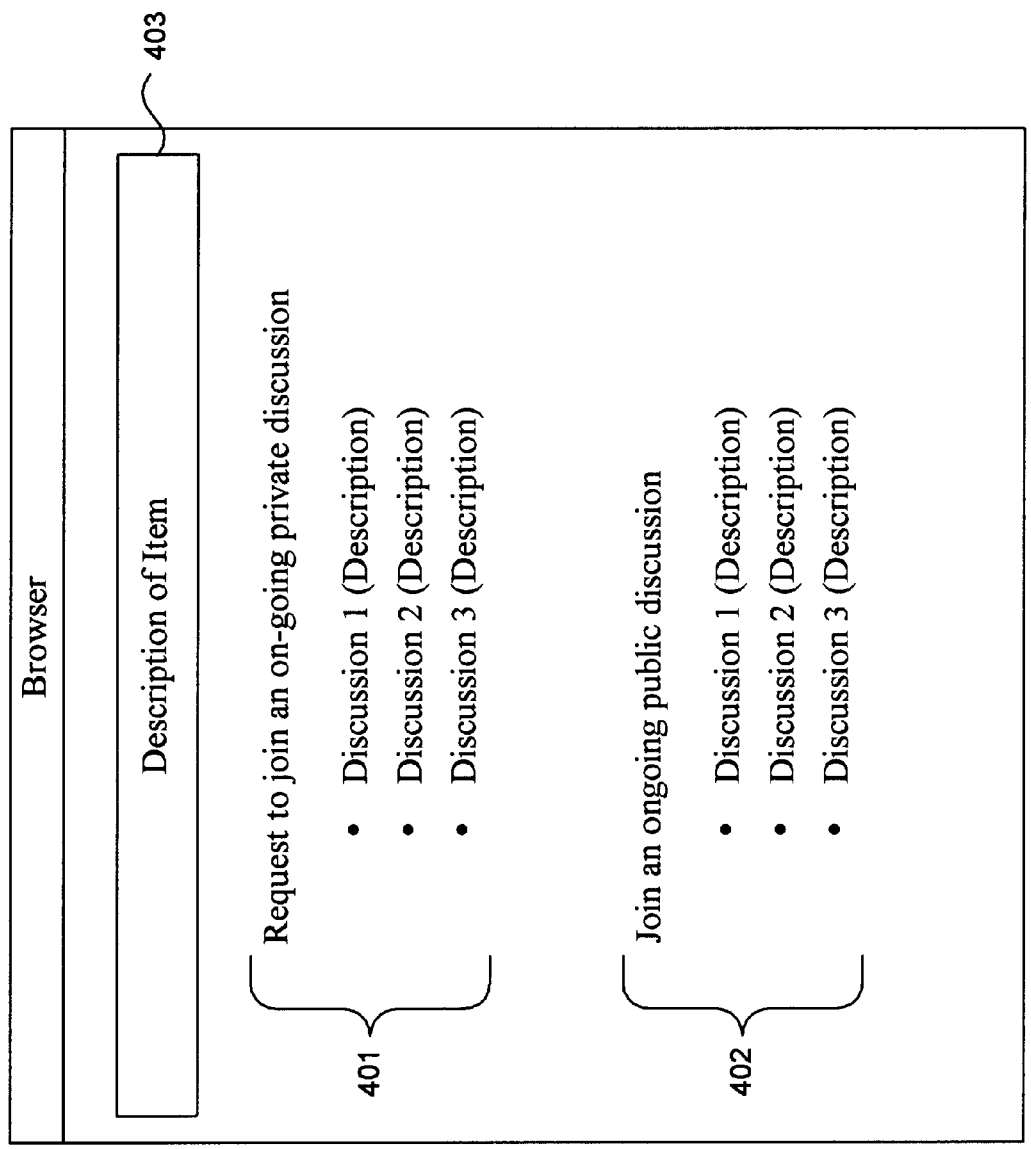
FIG. 4 is a diagram illustrating a sample join a discussion display.

FIG. 4 is a diagram illustrating a sample join a discussion display. When a user selects the join a discussion button, the discussion system displays the join a discussion display. The user may join a public discussion or may request to join a private discussion that is open. Open private discussions may only be joined with permission of the originating participant or other designated user, whereas closed private discussions may not be joined at all. In the private discussion section 401, the discussion system lists each of the open private discussions relating to the item that have been designated as "open." The description of the discussion can be provided by the originating participant (as described above) or automatically generated by the discussion system. If automatically provided, the description of the private discussion would not identify the participants and would only provide a general overview of the discussion to preserve the privacy of the discussion. In the public discussion section 402, the discussion system lists each of the public discussions relating to the item. The discussion system can automatically generate a description for a public discussion that provides details of the public discussion and may include the identity of the participants.

Figure 5:
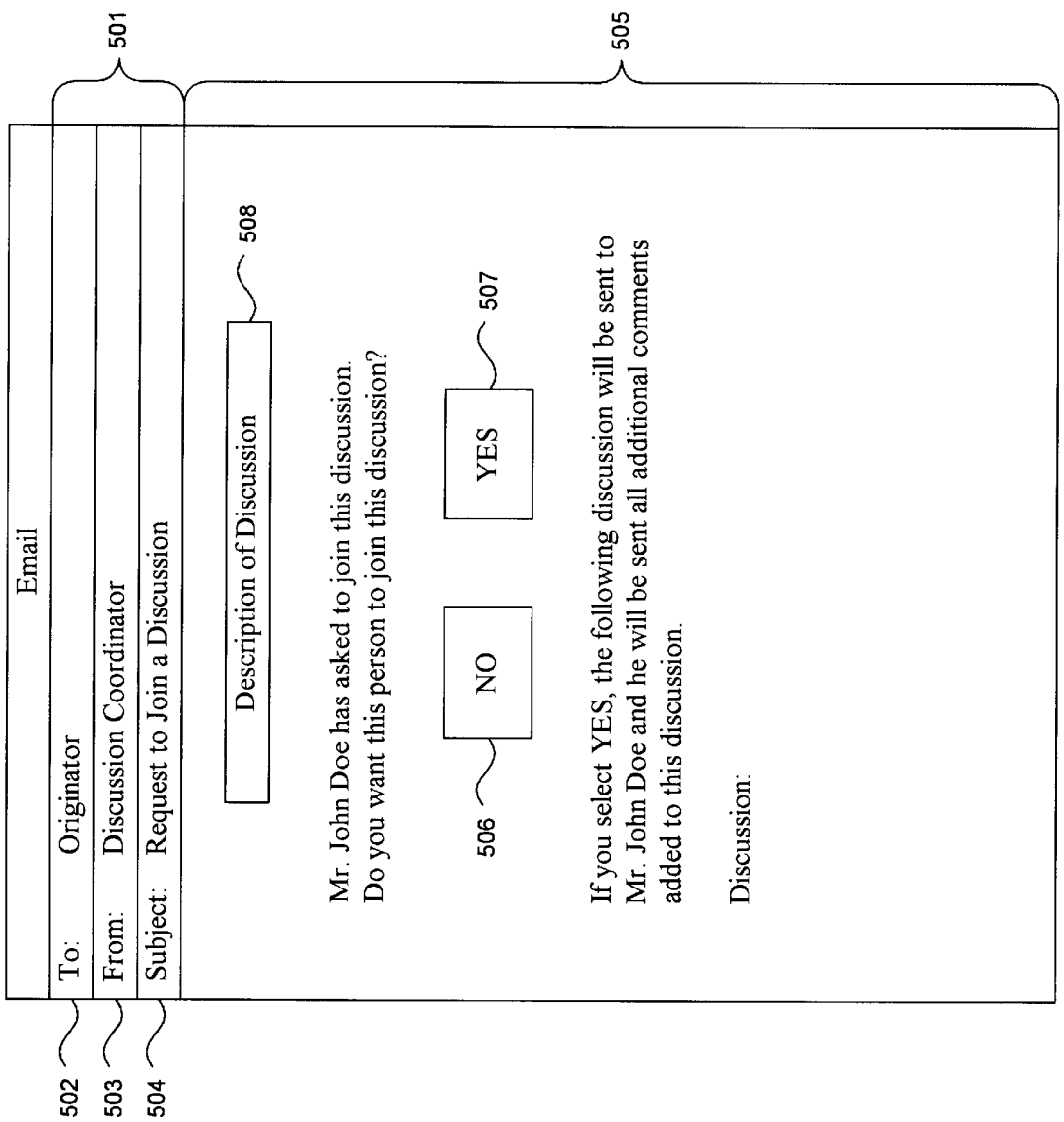
FIG. 5 is a diagram illustrating a sample email sent in response to request to join a private discussion.

FIG. 5 is a diagram illustrating a sample email sent in response to request to join a private discussion. The discussion system sends the email to a user who is authorized to grant permission to join the private discussion. The header section 501 contains a to field 502, which may indicate that the email is sent to the originating participant of the discussion. The header section also contains a from field 503, which identifies the discussion system, and a subject field 504, which indicates that this email relates to a request to join the discussion. Because the email is sent by the discussion system, the identities of the participants are kept confidential from the requesting user. The email body 505 indicates that a certain user has requested to join the discussion and asks the originating participant whether this user may join the discussion. The "NO" URL 506 and the "YES" URL 507 may be selected by the originating participant in response to this question. The email body also indicates that the requesting user will receive access to all comments of this discussion. The email body also contains a discussion description section 508 to identify the discussion to the originating participant. If the originating participant selects the "NO" URL, then the discussion system notifies, possibly by email, the requesting user that the request to join this discussion has been denied. If the originating participant selects the "YES" URL, then the discussion system sends a discussion email to the requesting user and adds the requesting user as a participant.

Figure 6:
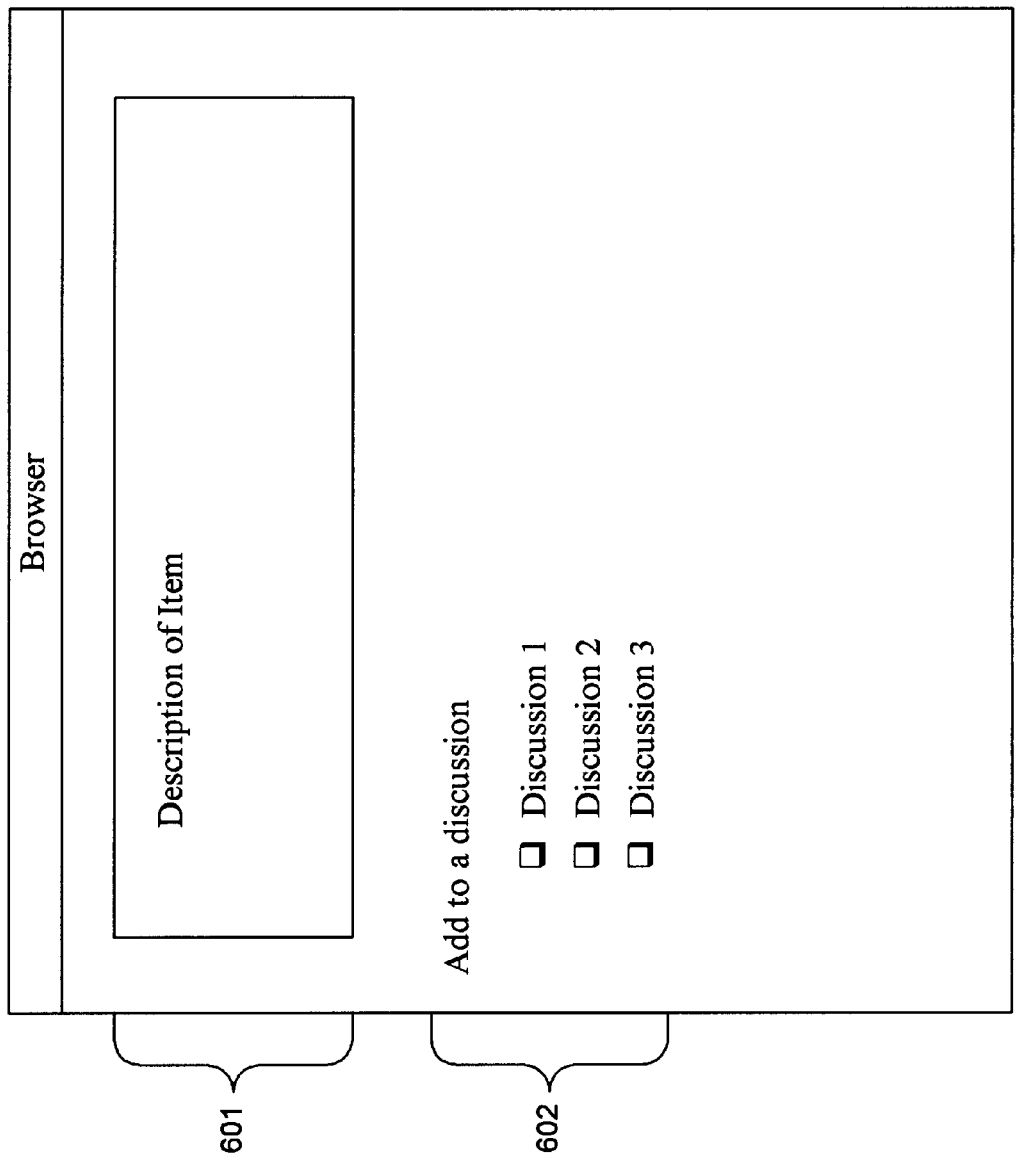
FIG. 6 is a diagram illustrating a sample Web page for adding an item to a discussion.

FIG. 6 is a diagram illustrating a sample Web page for adding an item to a discussion. A participant may want to add an item to a discussion, for example, to contrast that item with the topic of the discussion. The discussion system displays this Web page in response to selection of the add to a discussion button. The add to a discussion display contains a description of the item 601 that is to be added to a discussion, and a list 602 of the discussions in which the user is participating. The list of discussions includes sufficient detail to identify each of the discussions to the user. The user selects the discussion to which the item is to be added. In one embodiment, the discussion system adds an item by adding to the discussion thread a URL to information for the item. Alternatively, the discussion system may add the description of the item and a purchase URL to the discussion thread.

Figure 7:
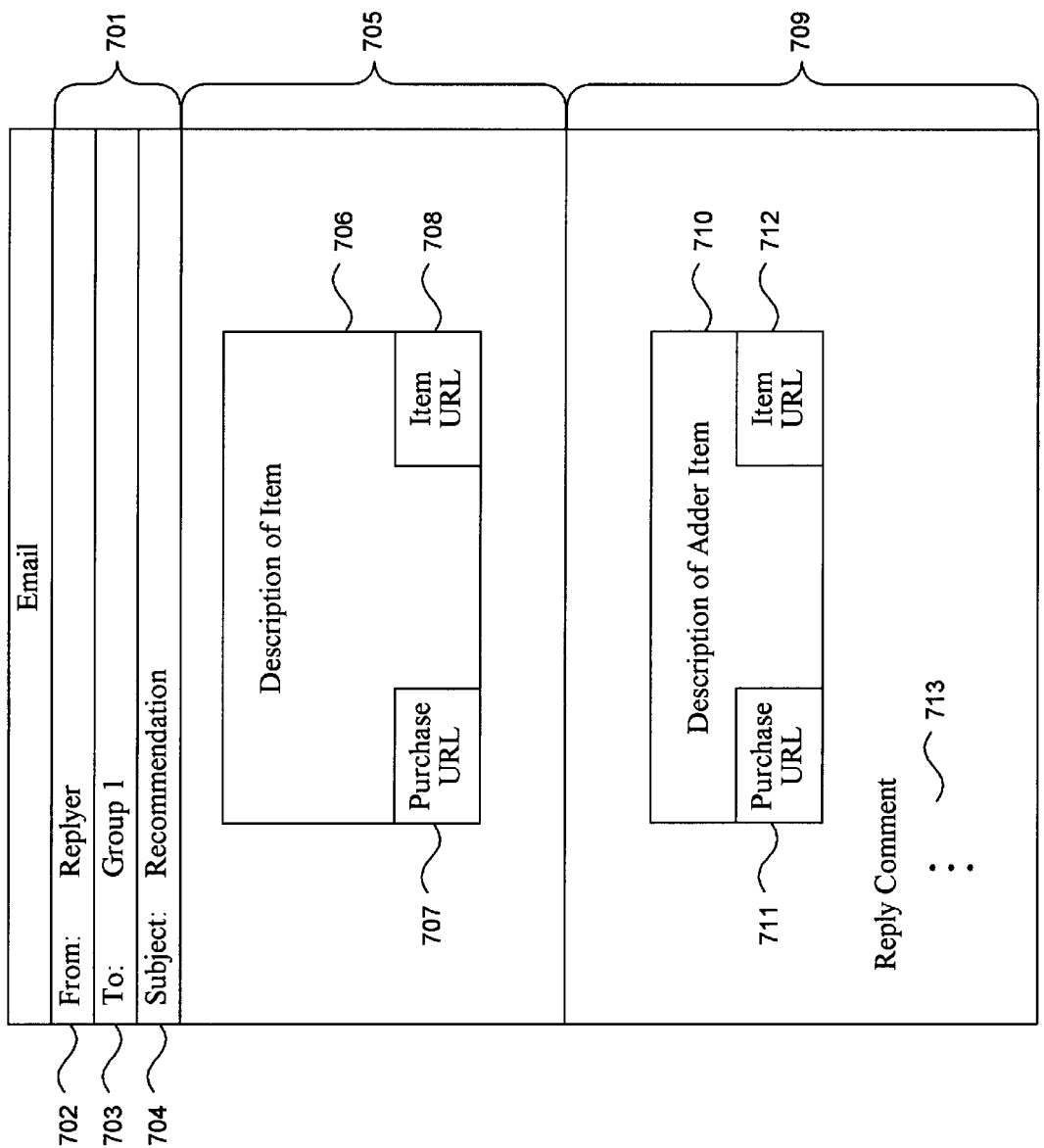
FIG. 7 is a diagram illustrating a sample email that is displayed when an item is being added to a discussion.

FIG. 7 is a diagram illustrating a sample email that is displayed when an item is being added to a discussion. The email contains a email header 701, a discussion header 705, a reply comment section 709, and a previous discussion section (not shown). The discussion header section contains a description of the item section 706 that is the topic of the purchase URL 707 and an item URL 208. The reply comment section contains a description of the item 710 that has been added to the discussion along with a purchase URL 711 and an item URL 712 for the item that has been added to the discussion. The reply comment section also contains a comment area 713 in which the replying participant may add comments.

FIG. 8 is a diagram illustrating a sample Web page that describes the discussions in which the user is a participant. The Web page contains a private discussion section 801 and a public discussion section 802 that contain information relating to the discussions. The user may select a discussion to view its discussion thread. The user can then add additional comments to that discussion. The user may also request to withdraw from a discussion. A discussion may be terminated by the originating participant. After a certain period of inactivity, the discussion system may send an email to the originating participating inquiring as to whether the discussion should be terminated.

Figure 9:
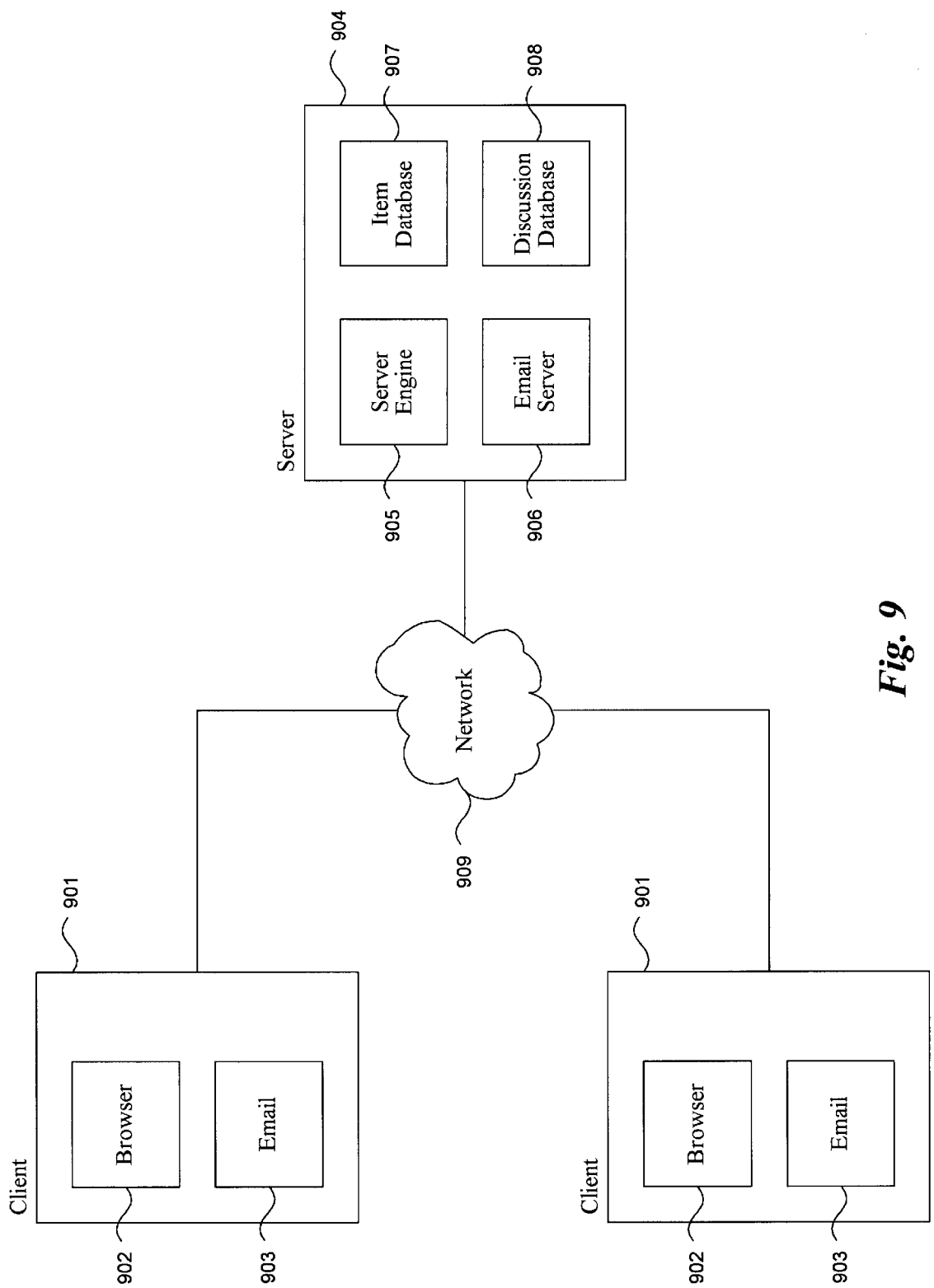
FIG. 9 is a block diagram illustrating the example embodiment of the discussion system.

FIG. 9 is a block diagram illustrating the example embodiment of the discussion system. In this embodiment, the discussion system is implemented in a client/server environment. The client computers 901 are connected to the server computer 904 by a network 909, such as the Internet. Each client computer contains the client component of the discussion system. The client component of the discussion system includes a browser component 902 and may include an email component 903 if an external message management facility is used. The server component of the discussion system includes a server engine 905, an email server 906, an item database 907, and a discussion database 908. The client and server computers include a central processing unit, memory, and input output devices. The client component and a server component may be stored on a computer-readable media such as memory, CD ROM, flexible disk, hard disk, etc. The browser of the client component may be a standard Web browser, and the email component may be the client side of a standard email server. The server engine of the server component may be a standard Web server that receives URLs and provides Web pages and executes discussion system code, such as active server pages. The email server may be a standard email server or may be a custom email server to provide email via Web pages. The item database may contain a description of the items (e.g., books) that can be displayed by the browser. The discussion database contains information describing the discussions. If the discussion system provides email via the browser, that is an internal message management facility, then the conventional email component of the client component and a conventional email server are not needed.

Figure 10:
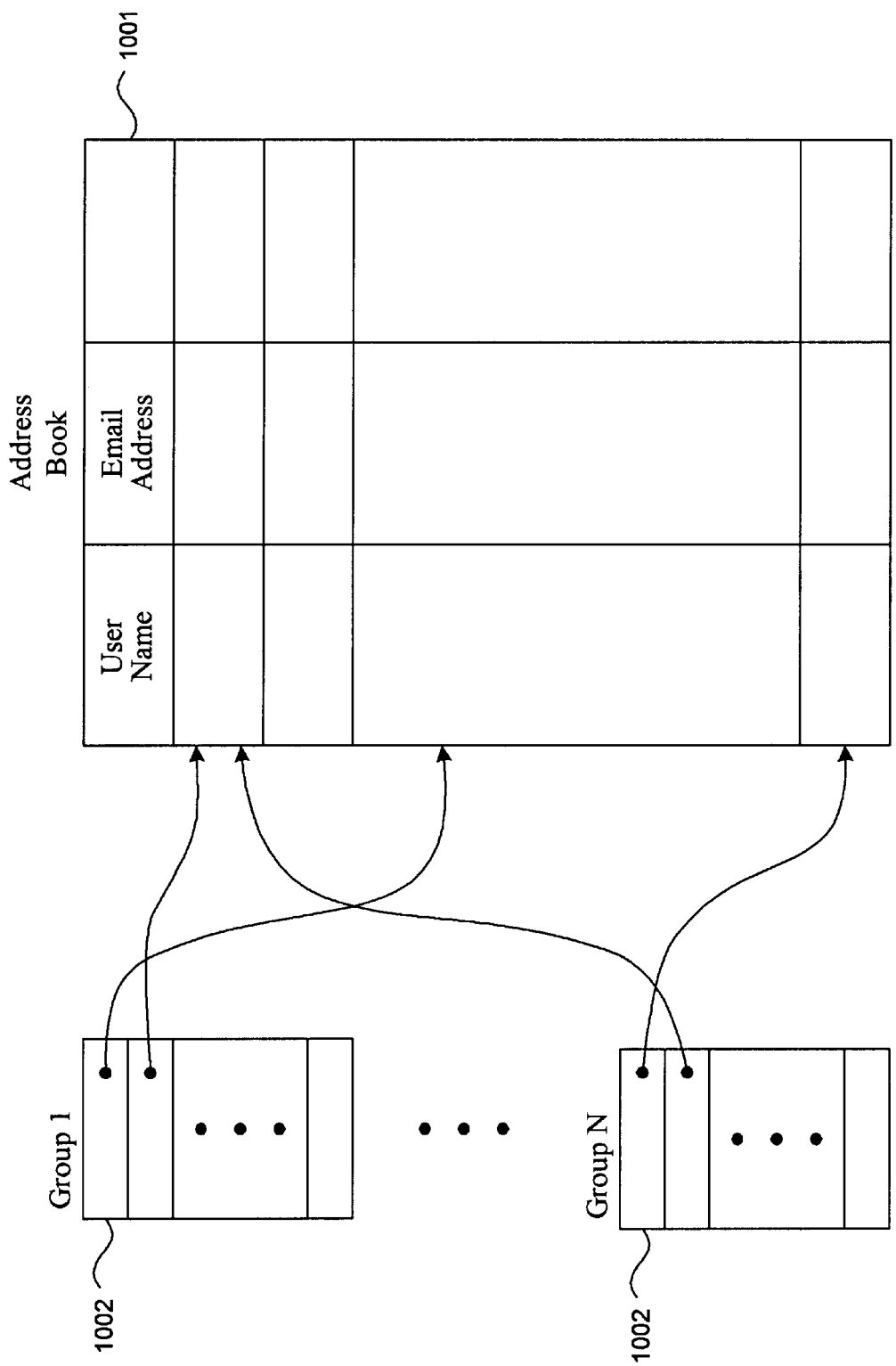
FIG. 10 is a block diagram illustrating an address grouping data structure of the discussion database.

FIG. 10 is a block diagram illustrating an address grouping data structure of the discussion database. The address grouping data structure includes address book 1001 and group lists 1002. Each entry in the address book contains a user name and an email address for that user, and may contain additional information about the user. The discussion system maintains an address book for each user. Each user may define various groups of users who can be participants in a discussion originated by the user. The group listings references the address book entries for the users within that group. The group listings may also contains additional information describing or naming the group. Alternatively, the discussion system may use the addressing capabilities of an external message management facility. The discussion system itself may advertise certain public groups (eg., relating to baseball cards or to stamp collections). The discussion system may allow any user to add and remove their name from a public group and to designate a public groups as listing the participants when starting a discussion.

Figure 11:
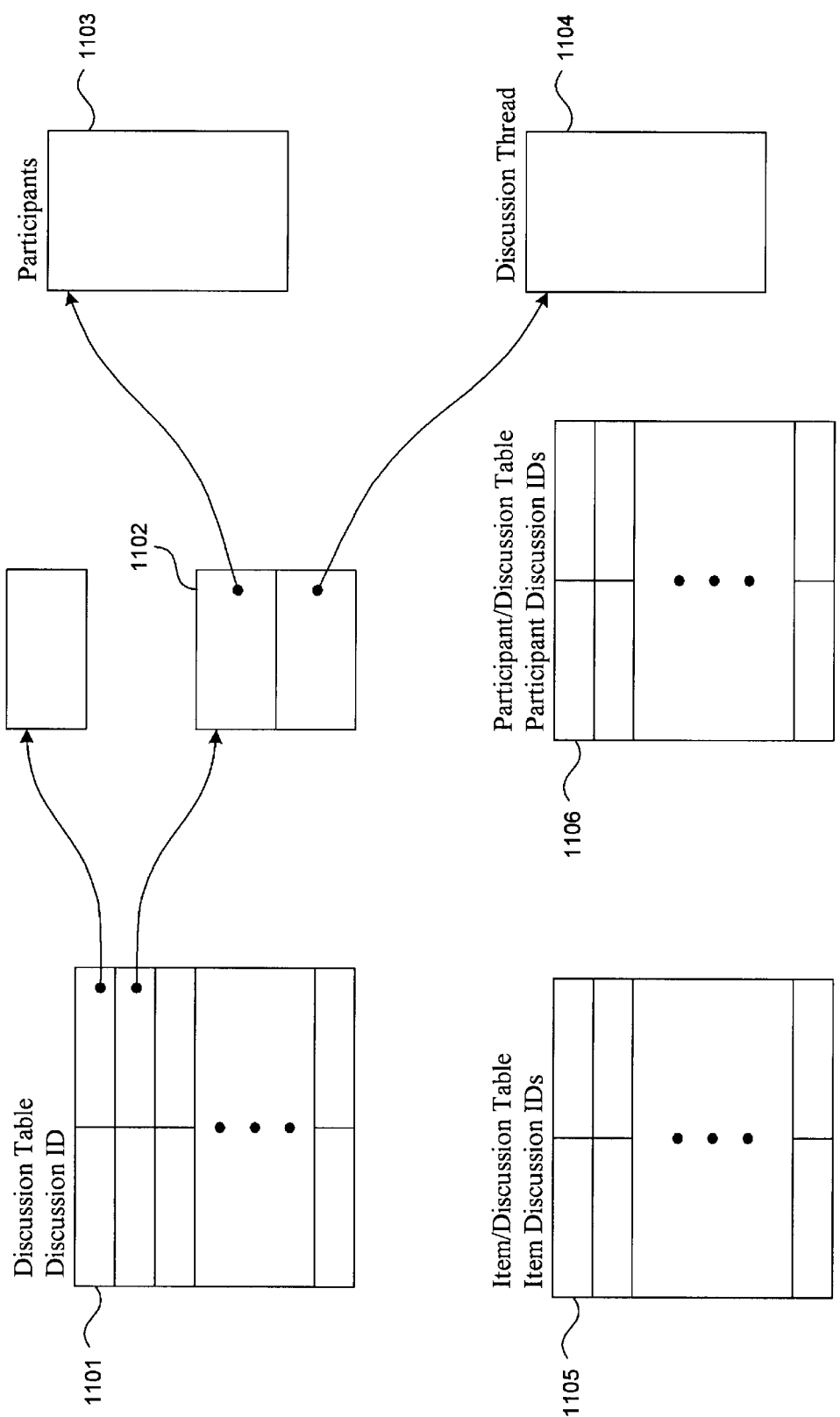
FIG. 11 is a block diagram illustrating discussion related data structures in the discussion database.

FIG. 11 is a block diagram illustrating discussion related data structures in the discussion database. The discussion related data structures include discussion table 1101, item/discussion table 1105, and participant/discussion table 1106. The discussion table contains an entry for each discussion. Each entry contains a discussion ID along with a reference to the definition of the discussion. The entries may also contains additional information such as the name of the originating participant of the discussion, description of the discussion, and status of the discussion (e.g., ongoing or terminated). The definition of the discussion identifies the participants of the discussion and the discussion thread. The participants table 1102 lists the participants, and the discussion thread table 1104 contains the comments of the discussion. The comments of the discussion may be stored in email-type format or may be stored in a more structured format that identifies the sequence number of each comment, the item being discussed, the text of each comment, and the participant that generated the comment. The item/discussion table contains a cross-reference from each item that is a topic of a discussion to the discussion IDs. Each entry contains an item ID along with one or more discussion IDs. The discussion system uses the item/discussion table to rapidly identify the discussions relating to an item. The participant/discussion table contains a cross-reference from participants to the discussion. The discussion system uses the participant/discussion table to rapidly identify the discussions in which a user is participating.

Figure 12:
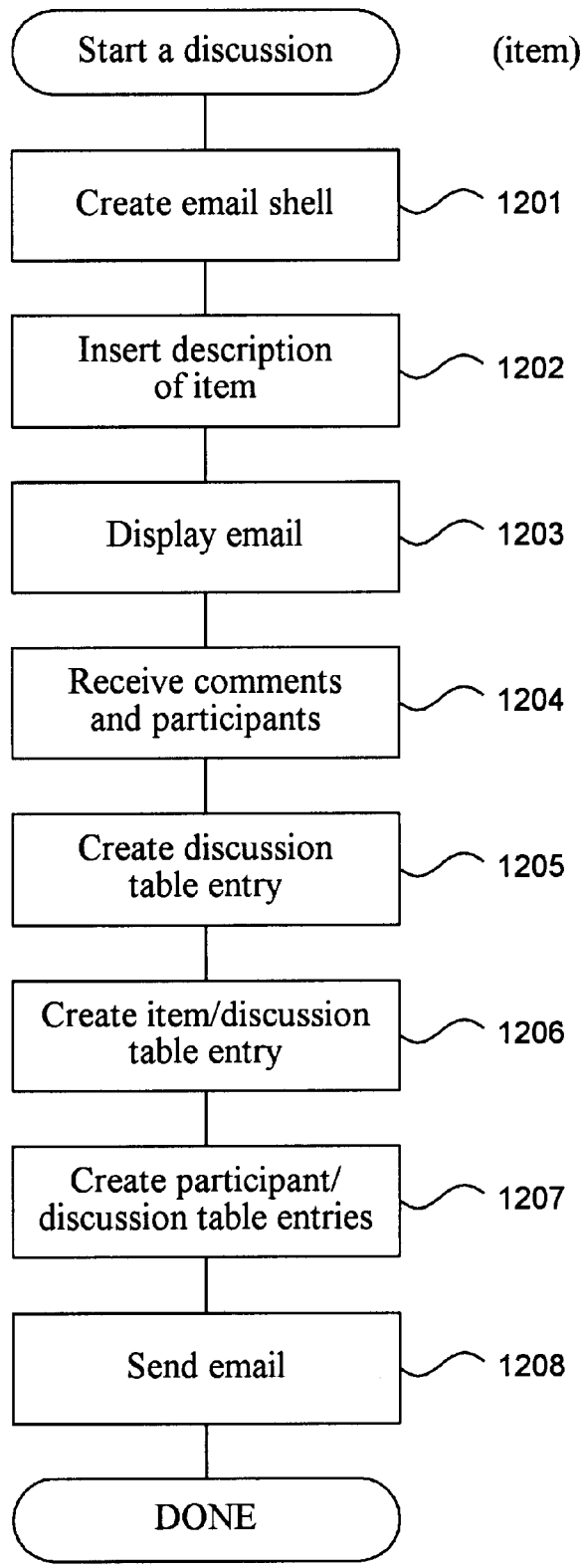
FIG. 12 is a flow diagram of an example implementation of a routine to start a discussion.

FIG. 12 is a flow diagram of an example implementation of a routine to start a discussion. This routine is invoked when a user selects to start a discussion. This routine creates the initial message with a description of the item, receives comments and the list of participants for the user, initializes the data structures in the discussion database, and sends the message to the participants. In step 1201, the routine creates a message shell that includes a header and an empty body. The routine may also initialize a subject field of the header to describe the item that is the subject of the discussion. In step 1202, the routine inserts a description of the item into the body of the message. In step 1203, the routine displays the message to the originator. In step 1204, the routine receives comments added to the message, the list of participants (e.g., as indicated in the to field of the header), and possibly revisions to the subject field. The routine may also receive an indication as to whether the discussion is public or private and, if private, as to whether the discussion is open or closed. In step 1206, the routine creates an entry for the discussion table. The routine initializes the participants list and discussion thread for that entry based on the received comments and participants. In step 1207, the routine creates an entry in the item/discussion table for the item which is the subject of the discussion. In step 1208, the routine creates an entry in the participant/discussion table for each of the participants in the discussion. In step 1209, the routine sends a copy of the message to each of the participants. The routine then completes.

Figure 13:
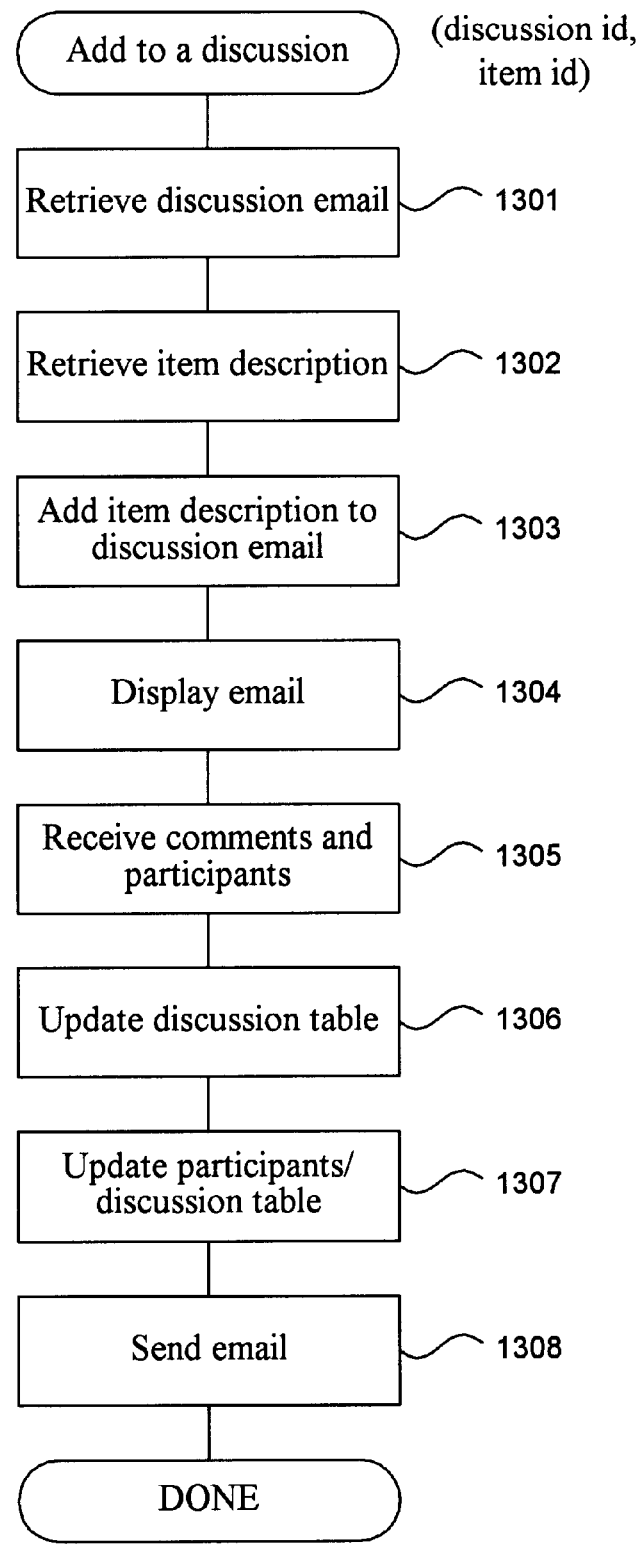
FIG. 13 is a flow diagram of an example implementation of a routine to add an item to discussion.

FIG. 13 is a flow diagram of an example implementation of a routine to add an item to discussion. This routine is passed the identification of the discussion and the identification of the item. This routine adds the description of an item to a discussion, receives comments from the participant, sends the message to the other participants, and updates the discussion database. In step 1301, the routine retrieves the discussion thread for the identified discussion from the discussion table. In step 1302, the routine retrieves a description of the item to be added from the item database. In step 1303, the routine adds the retrieved description to the discussion and the discussion thread to a message. In step a 1304, the routine displays the message. The to field of the header of the message may be pre-filled with a list the current participants in the discussion. In step 1305, the routine receives comments to be added to the discussion along with retrieved description to the participants. In step 1306, the routine updates the discussion table to add the received comments and the retrieved description of the item. In step 1307, the routine updates the participant/discussion table as appropriate. In step 1308, the routine sends the message to each of the participants and then completes.

From the foregoing it will be appreciated that, although specific embodiments of the invention have been described herein for purposes of illustration, various modifications may be made without deviating from the spirit and scope of the invention. For example, the discussion system may provide a capability to ensure anonymity of the participants. Each user may have a pseudonym that is mapped to their email address. Users may know of other users by these pseudonyms. To support such anonymity, the discussion system would need to use an internal message management facility or, if it uses an external message management facility, it would need to receive each message of a discussion from a replying participant and forward the received message to the other participants. Also, each message that is sent to a participant may include a unique URL that, when selected by the participant, would effect the withdrawal of the participant from the discussion. Accordingly, the invention is defined by the claims that follow.

What is claimed is:

1. A method in a computer system of a non-participant for starting a discussion relating to an item offered for sale, the method including:

providing information describing a plurality of items being offered for sale;

receiving from an originating participant a selection of one of the items being offered for sale;

providing to the originating participant information describing the selected item offered for sale and an indicator for starting a discussion relating to the item being offered for sale, the information and the indicator to be displayed to the originating participant;

in response to selection of the displayed indicator by the originating participant of the discussion, providing to the originating participant an initial discussion thread that includes a description of the item being offered for sale;

receiving from the originating participant comments to be added to the discussion thread;

receiving from the originating participant an indication of one or more other participants of the discussion;

providing the discussion thread, with the description of the item and the received comments added along with a link that when selected effects the placing of an order to purchase the item, to the one or more other participants, and tracking the discussion thread as one or more of the participants add comments to the discussion.

2. The method of claim 1 wherein the link is a URL.

3. The method of claim 1 wherein the sent discussion thread includes a link that when selected effects the providing of additional information relating to the item.

4. The method of claim 3 wherein the link is a URL.

5. The method of claim 1 including:

displaying the sent discussion thread to a participant;

receiving from the participant comments to be added to the discussion;

sending the discussion thread with the received comments added to other participants of the discussion.

6. The method of claim 5 including receiving from the participant to whom the discussion thread is displayed an indication of another item and adding information relating to that item to the discussion thread before sending the email to the other participants of the discussion.

7. The method of claim 6 wherein the information relating to the other item is a link to additional information relating to the other item.

8. The method of claim 7 wherein the link is a URL.

9. The method of claim 6 wherein the information relating to the other item is a description of the other item.

10. The method of claim 5 wherein the sending of the discussion thread with the received comments added includes sending the discussion thread to a discussion system to track the discussion.

11. The method of claim 1 wherein the receiving of an indication of the one or more other participants includes receiving an identifier of a group of participants.

12. The method of claims 1, 3, 5, or 6 wherein the discussion thread is implemented via email.

13. A method in a computer system for joining an discussion relating to an item being offered for sale, the method including:

tracking a discussion thread as one or more participants add information to the discussion;

providing information describing the item and au indicator for joining a discussion relating to the item, the information and the indicator to be displayed to a requesting user;

in response to selection of the displayed indicator by the requesting user, notifying a designated user for the discussion that the requesting user has requested to join the discussion;

receiving from the designated user a join indication as to whether the requesting user may join the discussion; and when the join indication indicates that the requesting user may join the discussion, adding the requesting user as a participant of the discussion; and notifying the requesting user in accordance with the join indication, the notifying including providing the discussion thread to the requesting user, the discussion thread including a link that when selected effects the placing of an order to purchase the item.

14. The method of claim 13 wherein when multiple discussions relating to the item are ongoing, in response to selection of the displayed indicator, providing to the requesting user an indication of the multiple discussions so that the requesting user can select the discussion to join.

15. The method of claim 13 wherein the notifying of the designated user includes providing a request denied link and a request granted link that when selected by the designated user indicates whether the requesting user may join the discussion.

16. The method of claim 15 wherein the links are URLs.

17. A method in a computer system for adding an item being offered for sale to a discussion relating to another item being offered for sale, the discussion having a discussion thread, the method including:

tracking the discussion thread as one or more participants add information to the discussion;

providing information describing the item and an indicator for adding the item to the discussion relating to the other item, the information and the indicator to be displayed to a participant of the discussion;

in response to selection of displayed indicator by the participant, adding a description of the item to the discussion for the other item; and providing the discussion thread for the discussion, with the added description of the item along with a link that when selected effects the placing of an order to purchase an item, to participants of the discussion.

18. The method of claim 17 including in response to selection of the displayed indicator, receiving comments from the participant and adding the received comments to the discussion thread of the discussion.

19. The method of claim 17 wherein when the participant is a participant in multiple discussions, in response to selection of the displayed indicator, providing to the participant an indication of the multiple discussions so that the participant can select the discussion to which the item is to be added.

20. A method in a computer system of a non-participant for conducting a discussion among participants, the method including:

receiving from a participant a selection of an item that is offered in a commercial transaction by the nonparticipant;

receiving comments from the participant relating to the selected item;

generating a electronic mail message that includes a description of the selected item, the received comments, and a link that when selected effects the placing of an order to purchase the selected item;

sending the generated electronic mail message to participants of the discussion;

receiving from a participant who received the generated electronic mail message additional comments to be added to the generated message;

sending the generated electronic mail message along with received additional comments to participants of the discussion; and tracking a discussion thread of the electronic mail messages sent by the participants.

21. The method of claim 20 including before receiving the selection providing a Web page with a description of the item and an indicator to start a discussion for the item.

22. A computer-readable medium containing instructions for causing a computer system of a non-participant to start a discussion relating to an item being offered for sale by the non-participant, by;

displaying information relating to the item being offered for sale to an originating participant;

receiving from the originating participant an indication to start the discussion relating to the item being offered for sale;

receiving from the originating participant comments relating to the item being offered for sale;

receiving from the originating participant an indication of one or more participants of the discussion;

providing information relating to the item, the comments and a link that when selected effects the placing of an order for the item to the one or more other participants and wherein the participants and the non-participant are unrelated entities; and tracking a discussion thread of comments sent by the participants.

23. The computer-readable medium of claim 22 including in response to receiving the indication to start the discussion relating to the item, displaying to the originating participant an initial discussion thread that includes information relating to the item.

24. The computer-readable medium of claim 22 including receiving from the originating participant information to be added to the initial discussion thread.

25. A method in a computer system for tracking a discussion relating to an item offered in a commercial transaction, the computer system being provided by a first party, the method comprising:

providing a description of a plurality of items offered in commercial transactions;

receiving from a second party a selection of one of the plurality of items;

in response to receiving the selection of au item, providing to the second part a description of the item;

receiving from the second party an indication to originate a discussion relating to the item, initial comments for the discussion, and an identification of a third party who can participate in the discussion;

storing the initial comments for the discussion and the identification of the third party;

providing the description of the item, the initial comments, and a link that when selected allows for the placing of an order to purchase the item to the third party; and tracking a discussion thread of comments that are added to the discussion by the participants.

26. The method of claim 25 wherein the description of the item and the initial comments are provided to the third party by the first party.

27. The method of claim 25 wherein the description of the item and the initial comments are sent via electronic mail message to the third party by the first party.

28. The method of clam 25 wherein the description of the item and the initial comments are provided to the third party by the second party.

29. The method of claim 25 wherein the description of the item and the initial comments are sent via electronic mail message to the third party by the second party.

30. The method of claim 25 wherein the parties are not affiliated with each other.

31. The method of claim 25 including after the third party is provided with the description of the item and the initial comments, receiving from the third party additional comments and storing the received additional comments.

32. The method of claim 25 including:

providing to a fourth party an indication of the discussion relating to the item;

receiving from the fourth party a request to participate in the discussion relating to the item; and providing the initial comments to the fourth party.

33. The method of claim 32 including determining whether the second party will allow the fourth party to participate in the discussion.

34. The method of claim 32 wherein the initial comments are sent via electronic mail message to the fourth party.

35. A method in a computer system for tracking discussions relating to items that are being offered for sale by a vending party, the method comprising:

receiving from an originating party a selection of one of the items being offered for sale;

receiving from the originating party an indication to start a discussion relating to the selected item, initial comments for the discussion, and an identification of a participating party;

storing an item identifier of the item, the initial comments for the discussion, and the identification of the participating party;

sending to the participating party an electronic mail message that contains information relating to the item, the initial comments, and a link that when selected allows the item to be purchased;

receiving from the participating party an electronic mail message containing additional comments for the discussion relating to the item;

storing the additional comments;

sending to the originating party an electronic mail message that contains information relating to the item and the additional comments; and tracking a discussion thread of the comments that are added to the discussion.

36. The method of claim 35 wherein the originating party and the participating party are not affiliated with each other.

37. The method of claim 35 including;

receiving from the participating party a selection of another item that is offered for sale by the vending party; and storing an indicator of the selection of the other item wherein the electronic mail message sent to the originating party includes information relating to the other item.

38. The method of claim 35 including:

sending to another party an indicator of the discussion relating to the item;

receiving from the other party a request to participate in the discussion relating to the item; and sending to the other party an electronic mail message including the initial comments and additional comments.

39. The method of claim 38 including determining whether the originating party will allow the other party to participate in the discussion.

40. The method of claim 35 including;

receiving from the originating party an identification of a group of participating parties;

storing an indicator of the group of participating parties;

sending to each participating party in the group of participating parties, an electronic mail message that includes information relating to the item and the initial comments.

41. The method of claim 35 including receiving from the originating party an indication of whether the discussion is public or private.

42. A computer-readable medium for controlling a computer system of a vending party to track a discussion relating to an item being offered for sale by the vending party, by a method comprising:

receiving from the originating party an indication to start a discussion relating to the item being offered for sale, initial comments for the discussion, and an identification of a participating party;

storing an item identifier of the item being offered for sale, the initial comments for the discussion, and the identification of the participating party to effect the tracking of the discussion;

sending to the participating party information relating to the item being offered for sale, the initial comments and a link that when selected effects the placing of an order for the item;

receiving from the participating party additional comments for the discussion relating to the item being offered for sale;

storing the additional comments;

tracking the stored comments as a discussion thread; and providing to the originating party information relating to the item being offered for sale and the additional comments.

43. The computer-readable medium of claim 42 wherein the providing includes sending an electronic mail message.

44. The computer-readable medium of claim 42 wherein the providing includes sending a web page.

45. The computer-readable medium of claim 42 wherein the originating party and the participating party are not affiliated with each other.

46. The computer-readable medium of claim 42 including:
   receiving from the participating party a selection of another item that is offered for sale by the vending party;
   storing an indicator of the selection of the other item; and
   providing to the originating party information relating to the other item.

47. The computer-readable medium of claim 42 including:
   sending to another party an indicator of the discussion relating to the item;
   receiving from the other party a request to participate in the discussion relating to the item; and
   providing to the other party the initial comments and additional comments.

48. The computer-readable medium of claim 47 including determining whether the originating party will allow the other party to participate in the discussion.

49. The computer-readable medium of claim 42 including:
   receiving from the originating party an identification of a group of participating parties;
   storing an indicator of the group of participating parties; and
   providing to each participating party in the group of participating parties information relating to the item and the initial comments.

50. The computer-readable medium of claim 42 including receiving from the originating party an indicator of whether the discussion is public or private.

51. The computer-readable medium of claim 50 including receiving from the originating party an indicator of whether a private discussion is open or closed.

52. A method in a client computer of an originating party for starting a discussion relating to an item being offered for sale, the method comprising:
   receiving from a computer of a third party a web page with information identifying an item being offered for sale and an indication of an action to perform to start a discussion relating to the item;
   displaying the web page;
   detecting performance of the indicated action to start a discussion relating to the item;
   sending to the computer of the third party an indicator to start a discussion relating to the item;
   receiving from the originating party initial comments for a discussion relating to the item and an identification of a participating part;
   sending to the computer of the third party the received initial comments and the identification of the participating party; and
   receiving from the computer of the third party additional comments for the discussion provided by the participating party
   wherein the computer of the third party provides information relating to the item, the initial comments, a link that when selected effects the purchasing of the item to the participating party and the computer of the third party tracks a discussion thread of the comments of the parties.

53. The method of claim 52 wherein the additional comments are received by the computer of the originating party via an electronic mail message.

54. The method of claim 52 wherein the third party is offering the item for sale.

55. The method of claim 52 wherein the originating party and the participating party are independent of the third party.

56. The method of claim 52 wherein the originating party, the participating party, and the third party are independent parties.

57. The method of claim 52 including:
   receiving a web page including a request by another party to participate in the discussion; and
   displaying the web page.

58. The method of claim 52 including receiving from the originating party an indication of whether the discussion is public or private.

59. The method of claim 58 including receiving from the originating party an indication of whether a private discussion is open or closed.

60. A computer system of a first party for tracking a discussion relating to an item being offered for sale, comprising:
   means for receiving from a second party who originates the discussion a selection of one of a plurality of items being offered for sale;
   means for receiving from the second party an indication to originate a discussion relating to the selected item, initial comments for the discussion, and an identification of a third party;
   means for storing the initial comments for the discussion and the identification of the third party,
   means for providing information relating to the item, the initial comments, and a link that when selected effects the purchasing of the item to the Ed party; and;
   means for tracking a discussion thread of the initial comments and additional comments added by participants of the discussion.

61. The computer system of claim 60 wherein the information relating to the item and the initial comments are provided via electronic mail message to the third party.

62. The computer system of claim 60 wherein the parties are not affiliated with each other.

63. The computer system of claim 60 including means for receiving from the third party additional comments and means for storing the received additional comments.

64. The computer system of claim 60 including:
   means for sending to a fourth party an indication of the discussion relating to the item;
   means for receiving from the fourth party a request to participate in the discussion relating to the item; and
   means for providing the initial comments to the fourth party.

65. The computer system of claim 64 including means for determining whether the second party will allow the fourth party to participate in the discussion.

66. The computer system of claim 64 wherein the initial comments are provided to the fourth party via an electronic mail message.

67. The computer system of claim 60 including means for receiving an indication as to whether the discussion is public or private.

68. The computer system of claim 67 including means for receiving an indication as to whether a private discussion is open or closed.

69. The computer system of claim 60 including means for notifying non-participating parties of the discussion.

70. The computer system of claim 69 wherein the means for notifying includes sending an electronic mail message.

71. The computer system of claim 69 wherein the means for notifying includes sending a web page.

* * * * *

UNITED STATES PATENT AND TRADEMARK OFFICE
CERTIFICATE OF CORRECTION

PATENT NO. : 6,525,747 B1  Page 1 of 1
DATED : February 25, 2003
INVENTOR(S) : Jeffrey P. Bezos It is certified that error appears in the above-identified patent and that said Letters Patent is hereby corrected as shown below:

Column 10,
Line 44, "participants, and" should be -- participants; and --;
Lines 48 and 54, "sent" should be -- provided --;
Line 57, "sending" should be -- providing --;

Column 11,
Lines 3 and 5, "sending" should be -- providing --;
Line 17, "au" should be -- an --;

Column 12,
Line 38, "by;" should be -- by: --;

Column 13,
Line 5, "au" should be -- an --;
Line 6, "part" should be -- party --;
line 25, "clam" should be -- claim --;

Column 14,
Lines 9 and 30, "including;" should be -- including: --;

Column 15,
Line 55, "part" should be -- party --;

Column 16,
Line 33, "party," should be -- party; --;
Line 36, "Ed" should be -- third --;

Signed and Sealed this

Twenty-second Day of April, 2003

JAMES E. ROGAN
*Director of the United States Patent and Trademark Office*